United States Patent
Timmer et al.

(10) Patent No.: US 8,205,773 B2
(45) Date of Patent: Jun. 26, 2012

(54) LOGISTIC CONTAINER

(75) Inventors: Bernard Timmer, Conflans Saint-Honorine (FR); Jean-Noël Patry, Voisins le Bretonneux (FR)

(73) Assignee: Nexter Systems, Roanne (FR)

( * ) Notice: Subject to any disclaimer, the term of this patent is extended or adjusted under 35 U.S.C. 154(b) by 906 days.

(21) Appl. No.: 12/085,316

(22) PCT Filed: Nov. 13, 2006

(86) PCT No.: PCT/FR2006/002507
§ 371 (c)(1),
(2), (4) Date: Jun. 9, 2008

(87) PCT Pub. No.: WO2007/060307
PCT Pub. Date: May 31, 2007

(65) Prior Publication Data
US 2008/0290126 A1   Nov. 27, 2008

(30) Foreign Application Priority Data
Nov. 21, 2005   (FR) ...................................... 05 11743

(51) Int. Cl.
*B60R 9/00*   (2006.01)
(52) U.S. Cl. ........ 224/400; 224/547; 224/401; 224/404; 224/539; 220/826; 220/628

(58) Field of Classification Search .................. 224/545, 224/555, 556–561, 539, 404, 400, 401, 547; 220/480, 481, 810, 605, 606, 694, 628, 631, 220/826, 259.2; 294/137
See application file for complete search history.

(56) References Cited

U.S. PATENT DOCUMENTS

| | | | | |
|---|---|---|---|---|
| 2,673,671 A * | 3/1954 | Williams | ...................... | 224/555 |
| 4,249,684 A * | 2/1981 | Miller et al. | ................. | 224/42.4 |
| 4,946,215 A * | 8/1990 | Taylor | .......................... | 296/37.6 |
| 5,263,578 A * | 11/1993 | Narvey | ......................... | 206/232 |
| 5,395,019 A * | 3/1995 | Christensen | .................. | 224/511 |
| 5,653,366 A * | 8/1997 | Liserre | .......................... | 224/539 |
| 5,791,499 A * | 8/1998 | Zebbedies | ........................ | 211/64 |
| 5,924,615 A * | 7/1999 | McGarrah | ..................... | 224/404 |
| 6,666,362 B1 * | 12/2003 | LeTrudet | ...................... | 224/547 |
| 6,786,374 B2 * | 9/2004 | Schlecht | ....................... | 224/544 |
| 6,886,876 B1 * | 5/2005 | Damian | ......................... | 296/37.6 |
| 6,929,160 B2 * | 8/2005 | Elstone et al. | ................ | 222/526 |
| 7,669,443 B2 * | 3/2010 | Varner | ............................. | 70/58 |
| 2004/0173494 A1 * | 9/2004 | Elstone et al. | ............. | 206/524.4 |
| 2005/0061841 A1 | 3/2005 | Farentinos | | |

FOREIGN PATENT DOCUMENTS

FR          724 191 A       4/1932

* cited by examiner

*Primary Examiner* — Justin Larson
(74) *Attorney, Agent, or Firm* — Oliff & Berridge, PLC

(57) ABSTRACT

A logistic container intended to be made integral with a structure, such as a vehicle, and incorporating a clasping device intended to cooperate with a matching device carried by the structure, the container being of a geometry with several faces wherein the container incorporates at least two opening flaps each arranged on a separate face.

14 Claims, 4 Drawing Sheets

LOGISTIC CONTAINER

BACKGROUND OF THE INVENTION

1. Field of the Invention

The technical scope of the invention is that of logistic containers and in particular cases which are intended to be fastened to a vehicle, namely a military vehicle.

2. Description of the Related Art

Logistic containers are a classical accessory enabling the onboard capacities of a vehicle to be increased.

Most of the time they cannot be positioned inside the vehicle and must be able to be fastened simply and reliably to the vehicle's exterior.

To date, there is no universal container able to be fastened onto any vehicle.

Known solutions implement specific containers whose definition must be made by the vehicle's supplier itself. The geometry of these containers must take into account the vehicle's characteristics and the dimensions of the available spaces on its external walls.

Such solutions are not satisfactory. Each vehicle has its own containers, and the logistic complexity is thus increased. It is thus necessary for several container models to be managed or else to provide for long and fastidious halts in the field to enable transfer from one type of container to another.

SUMMARY OF THE INVENTION

The aim of the invention is to propose a logistic container that enables such drawbacks to be overcome.

Thus, the logistic container according to the invention may be relatively easily adapted from one type of vehicle to another and may be put into place in several different ways thereby improving its versatility.

The invention thus relates to a logistic container intended to be made integral with a structure, such as a vehicle, and incorporating clasping means intended to cooperate with matching means carried by the structure, such container being of a geometry with several faces and characterized in that it incorporates at least two opening flaps each arranged on a separate face.

Such an arrangement facilitates access to the inside of the container and enables installation in at least two different orientations.

Advantageously, the opening flaps may be arranged on contiguous faces perpendicular to one another.

With such an arrangement, when the container is fastened in a given orientation, one opening flap may be used for normal access and the other for quick emptying.

The container may incorporate at least two separate clasping means enabling the container to be made integral with the structure in at least two different orientations.

At least one opening flap may be held in the closed position by a sliding rod.

Advantageously, one opening flap may have a handle incorporating a profile in a chute shape able to receive a carrying bar.

In this case, the face parallel to the opening flap fitted with a carrying bar may also incorporate lifting means, arranged substantially at the same height as the handle and also able to receive a carrying bar.

These lifting means may be constituted by a ring.

The exterior face of at least one opening flap may be coated by a layer of elastomer.

BRIEF DESCRIPTION OF THE DRAWINGS

Other advantages of the invention will become apparent from the following description of a particular embodiment, such description being made with reference to the appended drawings, in which.

DETAILED DESCRIPTION OF PREFERRED EMBODIMENTS

Figure 1:
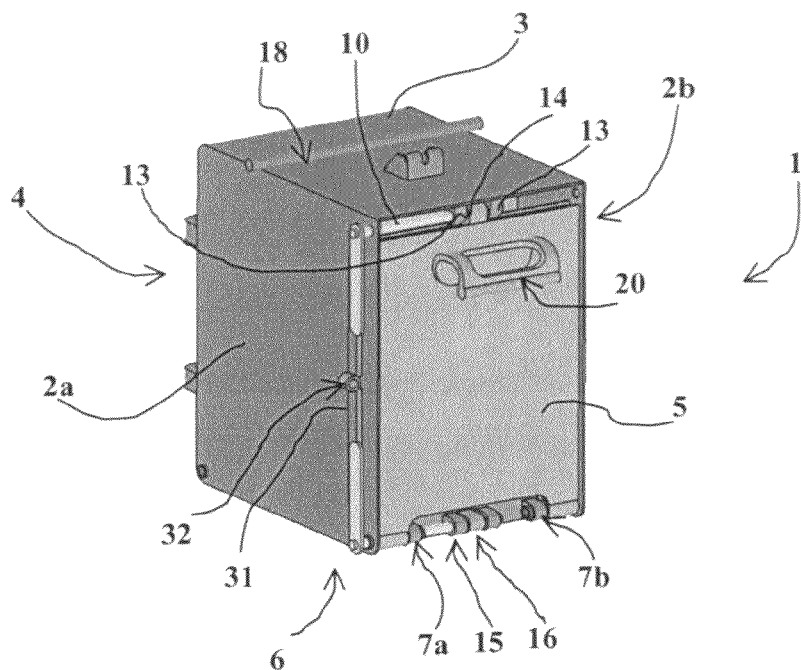
FIG. 1 shows a container according to the invention in a frontal three-quarter perspective view with all its opening flaps closed.

With reference to FIG. 1, a logistic container 1 according to the invention is parallelepipedic in shape and thus incorporates six faces. It comprises a mechanically-welded frame which is formed by: lateral faces 2*a* and 2*b*, upper face 3 and rear face 4. Onto this mechanically-welded structure forming the container body, two pivoting flaps are fastened both providing access to the inside of the container: a front flap 5 and a lower flap 6.

Each flap constitutes one face of the parallelepiped. The front flap 5 is parallel to the rear face 4, the lower flap 6 is parallel to the upper face 3. The flaps are thus arranged on contiguous faces and are perpendicular to one another.

Each flap is mounted able to pivot with respect to a hinge. Thus, the front flap 5 pivots with respect to hinges 7*a*, 7*b* which are integral with a beam connecting lateral faces 2*a* and 2*b* (see FIGS. 3 and 4).

Figure 4:
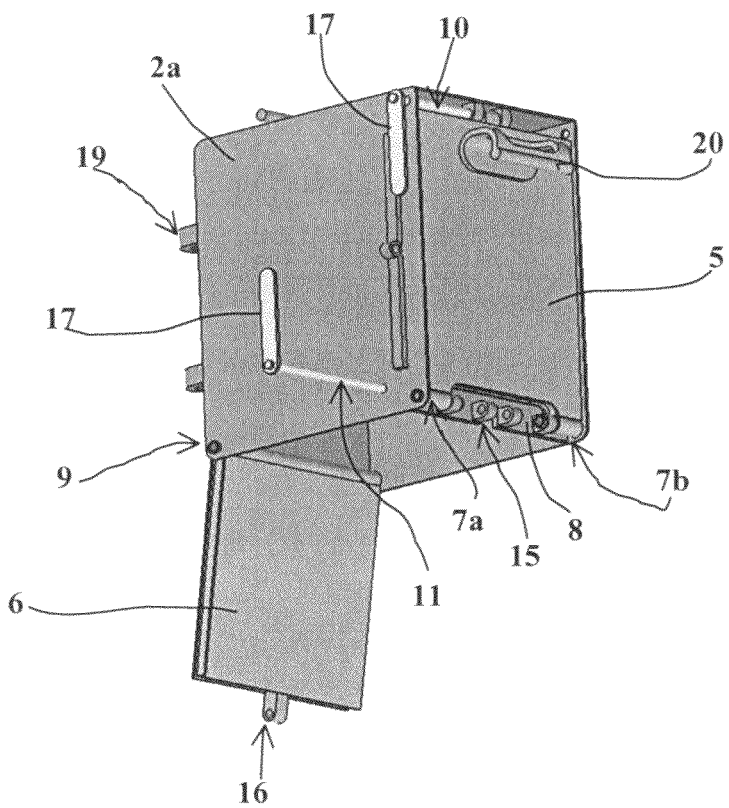
FIG. 4 shows this same container with a second flap open.

The lower flap 6 pivots with respect to a hinge 9 constituted by a pin linking lateral faces 2*a* and 2*b* (see FIG. 4).

Furthermore, each flap is held in a closed position by a sliding rod 10 or 11.

Figure 3:
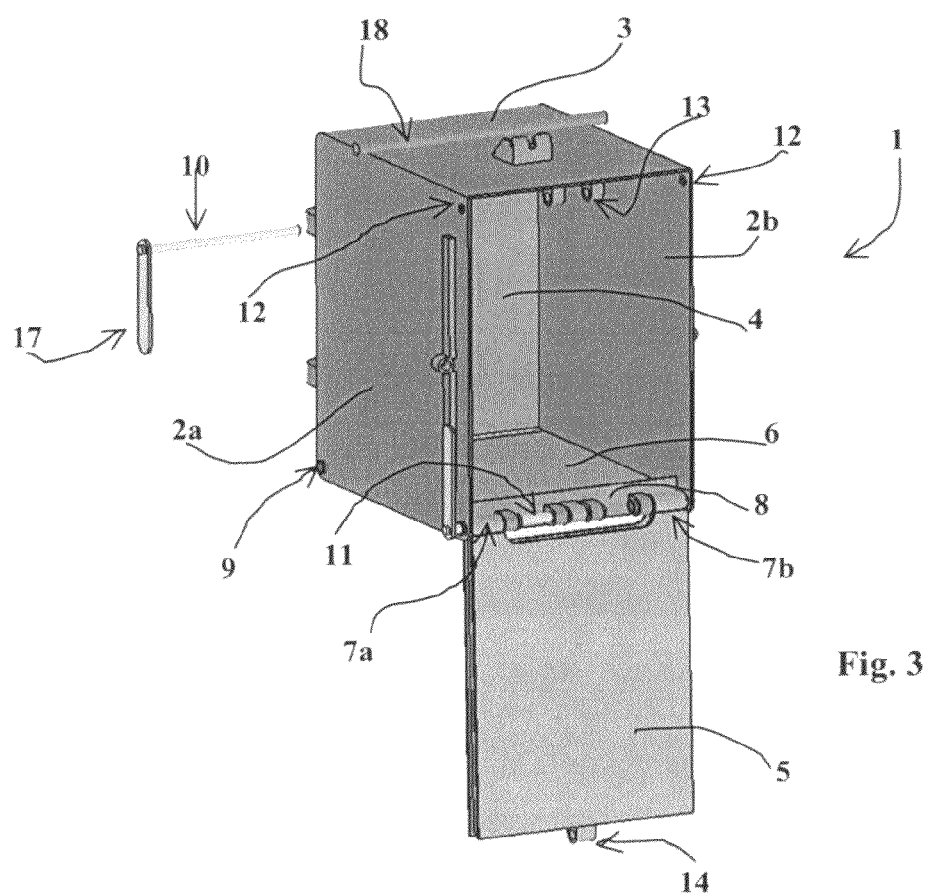
FIG. 3 is an analogous view to that of FIG. 1, with one flap open.

Rod 10 is thus positioned through drill holes 12 in lateral faces 2*a*, 2*b* (see FIG. 3). It passes through two tongues 13 carried on upper face 3 as well as tongue 14 carried by front flap 5, when the latter tongue is positioned between tongues 13 (FIG. 1).

In an analogous manner, rod 11 is positioned through hinges 7*a* and 7*b* and passes through the two tongues 15 carried by the beam 8 as well as tongue 16 carried by the lower flap 6 when the latter tongue is positioned between tongues 15 (see FIGS. 1 and 4).

The two rods 10 and 11 each carry an arm 17 which facilitates their removal. Locking means (not shown), for example padlocks, may be put into place to prevent the container being opened. These padlocks will be introduced, for example, in a hole in the end of rod 10 or 11 when this is set into position and protrudes slightly beyond the lateral face 2*b*.

The container according to the invention is shown in FIGS. 1 to 4 in a first orientation. This container is fastened to a structure such as a vehicle wall (not shown) by clasping means.

According to a particular embodiment, one example of clasping means is shown which are integral with the upper face 3 of the container. These means here incorporate a transversal bar 18 welded to the upper face 3. This bar protrudes slightly on either side of the containers from lateral faces 2a and 2b. It is intended to cooperate with matching clasping means (not shown) integral with the vehicle's structure (not shown). A fastening clasp may be provided, for example, which will retain the ends of the bar 18.

Figure 2:
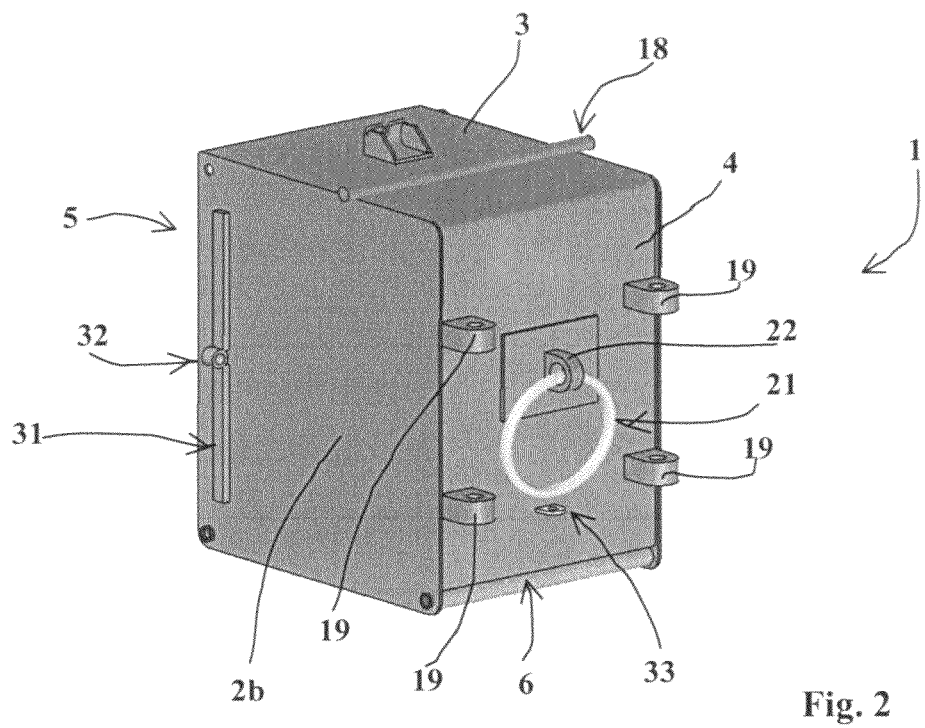
FIG. 2 shows this same container in a rear three-quarter perspective view.

The figures also show another example of clasping means integral with the rear face 4. These means here comprise four evenly spaced lugs 19 (FIG. 2). These lugs are pierced and are able to cooperate with matching means (not shown) integral with the vehicle's structure (not shown). The vehicle may, for example, be provided with analogous lugs which will be positioned below lugs 19 and between each lug a locking rods or bolts will be positioned.

We can thus see that it is possible for the container according to the invention to be fastened in a vertical orientation such as that shown in FIGS. 1 to 4.

Depending on constraints linked to the vehicles, this fastening may thus be carried out either on the rear face 4, or on the upper face 3.

When the container is thus fastened in its vertical position, the front flap 5 classically provides access to its content.

When it is necessary for the content of the container to be quickly emptied, the lower flap 6 can be opened. The full content of the container will thus be released and fall to the ground.

By way of a variant, the exterior face of the lower flap 6 may be coated by a layer of elastomer. When the container 1, positioned vertically, is unhooked, such a variant enables it to be protected from any effects due to the impact on the ground.

We observe in FIGS. 1 to 4 that the front flap 5 has a handle 20 incorporating a chute-shaped profile. The handle 20 is welded to the flap 5. The chute-shaped profile enables a carrying bar (not shown) to be positioned under the handle 20.

The rear face 4 which is parallel to the front flap 5 furthermore incorporates a ring 21 fixed to the rear face 4 by a lug 22 welded to face 4.

This ring 21 is positioned such that when another carrying bar is introduced in the ring, this bar is substantially at the same height as the carrying bar positioned under the handle 20.

It is thus possible for a full container to be carried safely by four people.

According to another characteristic of the invention, the clasping means are designed so as to make the container integral with the structure in at least two different orientations.

FIGS. 5 to 8 show the same container 1 arranged horizontally.

Figure 5:
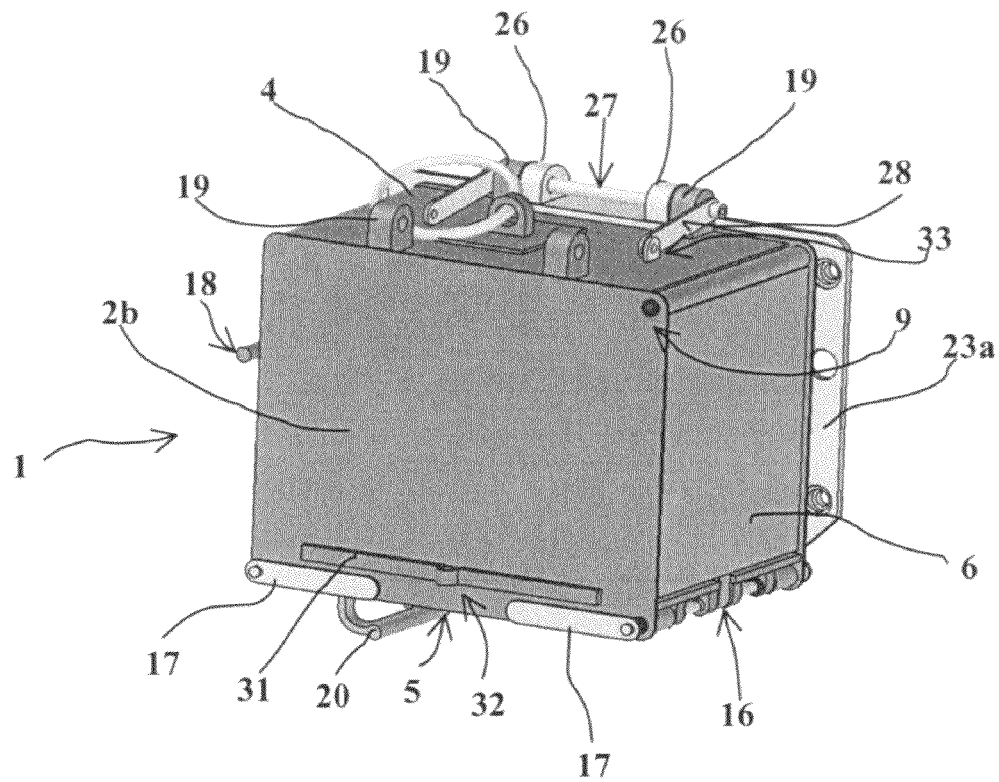
FIG. 5 shows this same container according to one example of its fastening onto a wall.
Figure 7:
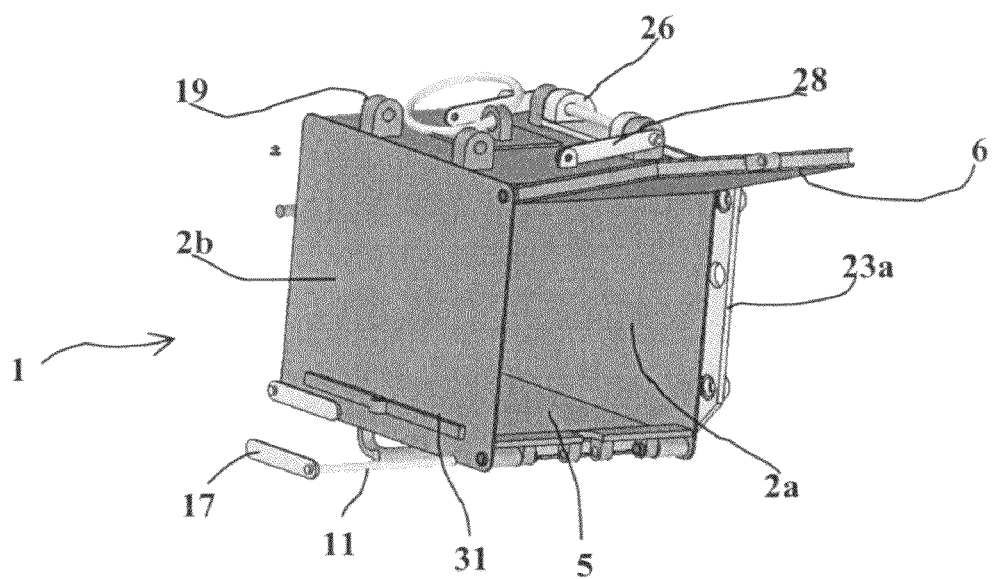
FIGS. 7 and 8 are analogous to FIG. 5 and show the container with one or other flap open.
Figure 8:
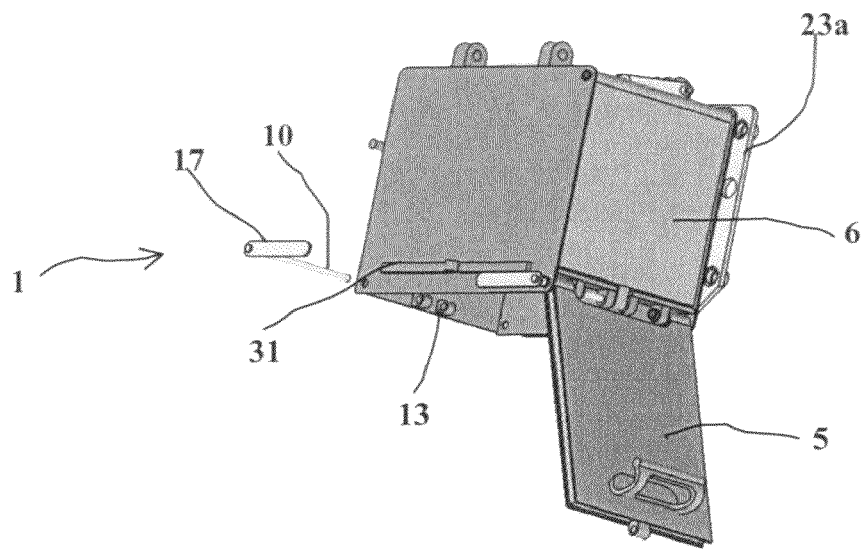

The lower flap 6 is thus arranged to the right of FIGS. 5, 7 and 8 whereas the front flap 5 is arranged underneath and constitutes the bottom of the container 1.

Figure 6:
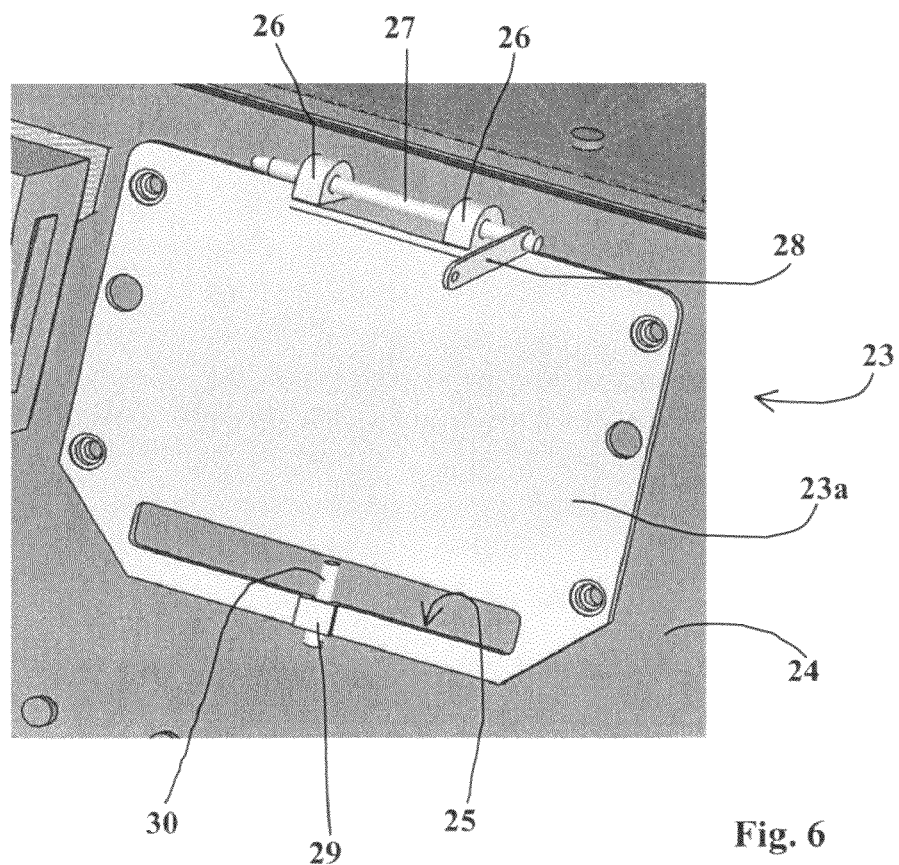
FIG. 6 is a view of the clasping means carried by the wall.

FIG. 6 shows the matching clasping means 23 integral with the wall 24 of a vehicle. These means here are constituted by a metal plate 23a screwed onto the vehicle and which incorporates at its lower part a substantially rectangular slot 25. The metal plate 23a has two lugs 26 in its upper part into which a rod 27 carrying a lever 28 is positioned.

The plate 23a furthermore carries a mounting 29 positioned substantially centrally to the slot 25. A removable finger 30 may be positioned in the mounting 29.

On the different Figures we can note that the container 1 has a welded metal strip 31 carrying a eye 32 on each of its lateral faces 2a and 2b.

When the container 1 is being mounted in its horizontal position, one metal strip 31 is positioned level with the slot 25.

Such an arrangement gives the container something to press on thereby facilitating its mounting. When the container is thus positioned, the lugs 19 of its rear face 4 are positioned on either side of the lugs 26 of the plate 23a (see FIGS. 5 and 7). The rod 27 is thus introduced through the holes in lugs 19 and 26 thereby ensuring the joining of the container and the plate 23a.

The end of the lever 28 is thus positioned opposite a lug 33 integral with the rear face 4 (FIG. 5). It is then possible for locking means (such as a padlock) to be put in place preventing the container 1 from being dismounted.

After the rod 26 has been put into place, the finger 30 will be positioned in the eye 32 and the mounting 29 thereby completely locking the container.

In this horizontal position it is the lower flap 6 which classically enables the content of the container 1 to be accessed (FIG. 7).

When it is necessary for the content of the container 1 to be rapidly emptied, flap 5 merely needs to be opened. The full content of the container is thus released and falls to the ground (FIG. 8).

We can see that depending on the constraints linked to the vehicle, it is possible for the flap 6 to be positioned to the right side or else to the left side. Indeed, the clasping means are symmetrical, the rear face 4 carrying four identical lugs 19 and each lateral face 2a, 2b carrying a metal strip 31.

The container according to the invention thus incorporates one single enclosed volume accessible by one or other of the flaps, depending on the position of the container.

The container according to the invention may thus be positioned in three different orientations, one vertical orientation and two horizontal orientations. In all cases, the functions of normal opening and fast emptying are ensured.

The invention has been described here with respect to the fastening of such a container onto a vehicle wall. The container according to the invention may naturally also be fastened to any type of fixed or mobile, land, air or naval structure.

Logistic containers may thus be standardized and be implemented in all types of equipment. Troop supplies are thus considerably facilitated.

The invention claimed is:

1. A logistic container configured to be made integral with a structure, such as a vehicle, the container having a plurality of faces incorporating one single enclosed volume and comprising:

at least two clasping devices configured to cooperate with at least one matching device carried by the structure and configured to enable the container to be made integral with the structure in at least two different orientations, one of the at least two orientations being horizontal and another of the at least two orientations being vertical; and at least two opening flaps each arranged on a separate face, wherein each of the at least two opening flaps includes a pivot around which the opening flap rotates and a securing mechanism configured to retain the opening flap in a closed position, the volume is accessible by each of the at least two opening flaps, and the pivot of one of the at least two opening flaps includes the securing mechanism of another of the at least two opening flaps.

2. A logistic container according to claim 1, wherein the securing mechanism of at least one of the at least two opening flaps is a sliding rod.

3. A logistic container according to claim 1, wherein an exterior face of at least one of the at least two opening flaps is coated by a layer of elastomer.

4. A logistic container according to claim 1, wherein each of the at least two opening flaps forms an entirety of the associated face.

5. A logistic container according to claim 1, wherein one of the at least two opening flaps has a handle incorporating a profile of a chute shape able to receive a carrying bar.

6. A logistic container according to claim 5, wherein the face parallel to the one of the at least two opening flaps that includes the handle also includes a lifting device, arranged substantially at the same height as the handle and also able to receive another carrying bar.

7. A logistic container according to claim 6, wherein the lifting device is a ring.

8. A logistic container according to claim 1, wherein the at least two opening flaps are arranged on contiguous faces perpendicular to each other.

9. A logistic container according to claim 2, wherein one of the at least two opening flaps is arranged facing the ground when the container is in the horizontal orientation and the other of the at least two opening flaps is arranged facing the ground when the container is in the vertical orientation.

10. A logistic container according to claim 9, wherein the securing mechanism of each of the at least two opening flaps is a sliding rod.

11. A logistic container according to claim 2, wherein
a first clasping device of the at least two clasping devices is fixed on a face that is opposite a first flap of the at least two opening flaps,
two pairs of lugs are fixed on a face that is opposite a second flap of the at least two opening flaps,
two lateral faces join a face equipped with the second flap and the face equipped with the lugs, and
the container further comprises two strips disposed each on one of the two lateral faces, each strip carrying an eye, each of the two strips in cooperation with one of the two pairs of lugs forming a second and a third clasping device.

12. A logistic container according to claim 11, wherein the first clasping device is formed by a bar.

13. A logistic container according to claim 11, wherein
a handle incorporating a profile of a chute shape able to receive a carrying bar is fixed on the second opening flap, and
a ring arranged substantially at the same height as the handle and also able to receive another carrying bar is fixed on the face on which the two pairs of lugs are fixed.

14. A logistic container according to claim 13, wherein the securing mechanism of each of the at least two opening flaps is a sliding rod carrying an arm.

* * * * *